(12) United States Patent
Smith (10) Patent No.: US 8,130,826 B2
(45) Date of Patent: Mar. 6, 2012

(54) SYSTEMS AND METHODS FOR PREPARING NETWORK DATA FOR ANALYSIS

(75) Inventor: Dale Trenton Smith, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1348 days.

(21) Appl. No.: 11/741,592

(22) Filed: Apr. 27, 2007

(65) Prior Publication Data

US 2007/0255847 A1 Nov. 1, 2007

Related U.S. Application Data

(60) Provisional application No. 60/795,293, filed on Apr. 27, 2006.

(51) Int. Cl.
*H04B 1/66* (2006.01)
(52) U.S. Cl. .................................. 375/240.02; 375/240
(58) Field of Classification Search .................. 375/240, 375/240.02
See application file for complete search history.

(56) References Cited

U.S. PATENT DOCUMENTS

| 6,181,267 B1 | 1/2001 | MacDonald et al. | |
|---|---|---|---|
| 6,205,145 B1 * | 3/2001 | Yamazaki | 370/395.65 |
| 2002/0176434 A1 * | 11/2002 | Yu et al. | 370/422 |

OTHER PUBLICATIONS

*Finisar's GTX Product Line Offers Complete & Accurate Analysis*, Copyright 2002 Finisar Corporation (4 pages).
*Protocol Knowledgeable GT-B Bit Error Rate Test System and Gigabit-Rate Physical Layer Verification System*, Finisar Corporation Dec. 2000 (4 pages).
*Transmeta Efficeon TM8600 Processor*, Transmeta Corporation, Jun. 2003, (2 pages).
*NP-1c Network Processor 10-Gigabit 7-Layer Network Processor with Integrated Search Engines*, http://www.ezchip.com/html/pr_np-1c.html, printed Dec. 2, 2004 (5 pages).
*Implementing Layer 4-7 Switches Using the NP-1c Network Processor*, EZchip Technologies Ltd., Feb. 17, 2004 (6 pages).
*What is Programmable Logic?* Copyright 1994-2004 Xilinx, Inc. http://www.xilinx.com/company/about/programmable.html, printed Dec. 17, 2004 (3 pages).
*Agilent Technologies E2688A, N5384A High-Speed Serial Data Analysis and Clock Recovery Software for Infiniium Oscilloscopes*, Agilent Technologies, Inc. Apr. 30, 2006 (8 pages).
GTX-SANMetrics Fibre Channel & GigE/iSCSI Debug & Analysis Tool, Finisar, 2002.

* cited by examiner

*Primary Examiner* — Edward Zee
(74) *Attorney, Agent, or Firm* — Volentine & Whitt, PLLC (57) ABSTRACT

Preparation of network data for analysis. An original frame representing a frame transmitted in a communications link can be received wherein the original frame comprises a payload. At least a portion of the payload can be removed from the original frame. Statistics can be inserted into the original frame to generate a modified frame. Original frames can be removed and not transmitted to an analysis system. A modified frame can represent several original frames that are removed. Additional frames can be generated. A frame can be generated that represents several original frames that have been removed. A generated frame or modified frame can indicate errors and/or preprocessing by a logic device.

17 Claims, 3 Drawing Sheets

SYSTEMS AND METHODS FOR PREPARING NETWORK DATA FOR ANALYSIS

CROSS-REFERENCE TO RELATED APPLICATIONS

This application claims the benefit of U.S. Provisional Application Ser. No. 60/795,293, filed on Apr. 27, 2006, which is incorporated herein by reference in its entirety.

BACKGROUND OF THE INVENTION

1. The Field of the Invention

The present invention relates generally to preparation of network data transmitted over a communication link. More specifically, embodiments of the present invention relate to preparation of network data transmitted at a high rate of speed for analysis of the network data.

2. The Relevant Technology

As the world becomes increasingly dependent on electronics for entertainment, business, and communication, the ability to safely and efficiently transmit large amounts of electronic data is of particular importance. Similarly, as the capacity and complexity of computer networks capable of transferring large amounts of data continues to rise, so does the need for diagnostic equipment that can efficiently monitor and diagnose problems within these networks.

Typically, as network data moves from a point of origin within the network to a different destination point, the network data passes through a variety of links or devices. Often, the devices use different types of hardware, each using a particular interface language or "protocol." Thus, as the network data travels through the system, the data is modified so that the data can be transmitted by the various devices, often causing errors or other problems with the network data.

Examples of commonly used high speed network protocols are Fibre Channels, Gigbit Ethernet, and ATM/OC3. For each of these protocols, specific diagnostic devices called protocol analyzers are connected to computer networks in order to record or trace data communicated across the network in an effort to capture information relating to performance and/or problems within the network.

In many networks, network data is transferred in packets or frames of data. By way of example, a frame may include many different fields such as a header, a payload, and a footer. The frame can be parsed to access the desired information in each field of the frame. The network data stream can also be described in terms of frames, block, cell, segment, or other terms known in the art.

In addition to transferring data, some networks, such as Fiber Channel communication networks may also transmit meta-data or information relating to the data or payload carried by the frames. This information may relate to the length of the frame, network synchronization, identification number or "Q" number, protocol, destination address, and originating address of the data. This information may be included in the frames in special fields, or may be transferred using primitives or other datatypes. Primitives are special 40-bit characters typically used in low-level or protocol-level handshaking. Primitives may also be associated with frames as start-of-frame or end-of-frame primitives.

Generally, protocol analyzers capture data traffic in the communication system over a defined period of time, or in response or connection to the occurrence of a predefined event. Using this captured data, the analyzers may allow a network administrator to track the progress of selected data as it moves across the various links in the communications system. In this manner, corrupted or altered data can be identified and traced to the problem within the communications system.

An analyzer can include various hardware and software elements configured to capture data from communications links in the communications system and may present the captured data in various formats to a user or technician by way of a graphical user interface or other output device.

With the invention of higher speed networks and higher speed protocols, the amount of information that must be monitored by a protocol analyzer has increased dramatically. Despite several advances in the field, many conventional analyzers are not capable of capturing and analyzing data at the high speeds utilized by modern computer networks. Thus there is a need for a system and method for preparing network data that improves the bandwidth capabilities of an analyzer by reducing the high bandwidth data stream used in modern high-speed networks into lower bandwidth streams that conventional analyzers may analyze.

BRIEF SUMMARY OF THE INVENTION

The present invention relates to preparation of network data for analysis. A method for preparing network data is described. The method includes transmitting a fibre channel frame. The frame includes a frame identifier field including information identifying the type of frame. The frame also includes at least one of a latched port status field, a dropped frame count field, a frame status flag field, a payload byte count field, a port number field, a byte count field, an error type field, or a 10b value field.

The method for preparing network data may also include generating a modified frame. The modified frame may be generated and transmitted upon the detection of an error by a decoder, field programmable gate array, or network processor. The modified frame is generated by creating a frame identifier field identifying the frame as a single-byte error frame and by adding a series of fields to the frame, including a timestamp field, a port number field, a byte count field, an error type field, and a 10b value field.

The method for preparing network data may also include preparing frames for analysis. The method includes receiving an original frame, representing a frame transmitted in a communications link, wherein the original frame comprises a payload. The method further includes removing a portion of the payload from the original frame and inserting at least one field into the original frame to generate a modified field, the inserted field(s) being a timestamp field, a port number field, a latched port status field, a dropped frame count field, a frame status flag field, and a payload byte count field.

A system for preparing network data is disclosed. The system includes a logic device. The logic device includes an input port, an output port, and executable instructions that when executed by the logic device cause the logic device to perform at least one function. The function can include removing at least a portion of a payload of an original frame to create a modified frame, inserting statistics into the original frame, inserting a frame identifier field into the original frame, generating a tick frame comprising the frame identifier field identifying the frame as a tick frame and a timestamp field, generating a primitive frame comprising the frame identifier field identifying the frame as a primitive frame, a repetition count field describing a number of identical primitives received by the logic device, and a primitive value field describing the value of each of the primitives received in the sequence, generating a single-byte error frame each time an error is detected by a decoder or the logic device, wherein the single-byte error frame comprises a frame identifier field identifying the frame as a single-byte error frame, a byte count field, an error type field, and a field describing the byte value, or generating a common mode frame when common mode signaling is detected by a physical connection to a communications link, wherein the common mode frame comprises a frame identifier field, a timestamp field, and a bit count field describing a duration of the common mode signaling.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention is directed toward preparation of network data for analysis. The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention. Descriptions of well-known components and processing techniques are omitted so as not to unnecessarily obscure the invention in detail. The figures are for illustration and may not necessarily be drawn to scale.

Embodiments of the present invention relate to preparing network data for analysis. The term 'network data' refers to a transmission, packet, primitive, frame, data, and any other information transferred in a communications link, data link, wireless link, optical link, copper link, Fibre channel link, Ethernet link, or other link of a data or communications system.

According to an aspect of the present invention, network data may be prepared by modifying the network data. One way that the network data can be modified is by removal of a portion of the network data. For example the network data can be modified by removal of a payload or field from the network data. The network data can also be modified by addition of information, such as fields or characters, to the network data. For example, the addition can be embodied by addition of fields and/or characters to the header and/or footer of the network data. The network data can be modified by a combination of both addition and removal of characters or fields from the network data. In addition, network data can be excluded and characters and/or fields can be added in order to indicate that a portion of the original network data was excluded.

Aspects of the present invention can be particularly advantageous when combined with subject matter that is contained within pending U.S. patent application Ser. No. 11/138,600, entitled "Distributed Stream Analysis Using General Purpose Processors", which is incorporated by reference and which describes many embodiments that can each be implemented in conjunction with any of the aspects disclosed herein. For example, several aspects of the present application can be combined in different configurations, sequences, and accomplished using a variety of apparatuses and processes that can implement (1) demultiplexing of network data so that the network data can be directed between and analyzed by multiple analysis processors, (2) distributing a piece of network data across multiple processors for network analysis, (3) filtering network data so as to reduce the amount of processing power required by excluding network data such as repetitive data or network data with known analysis results from further analysis, (4) prioritizing different analysis tests and algorithms so that less critical tests, tests that have already been conducted, tests with known results, and/or other tests can be excluded for the sake of more critical tests, and (5) scaling various aspects of the present invention so as to remove bottlenecks in network analysis apparatuses and systems.

Figure 1:
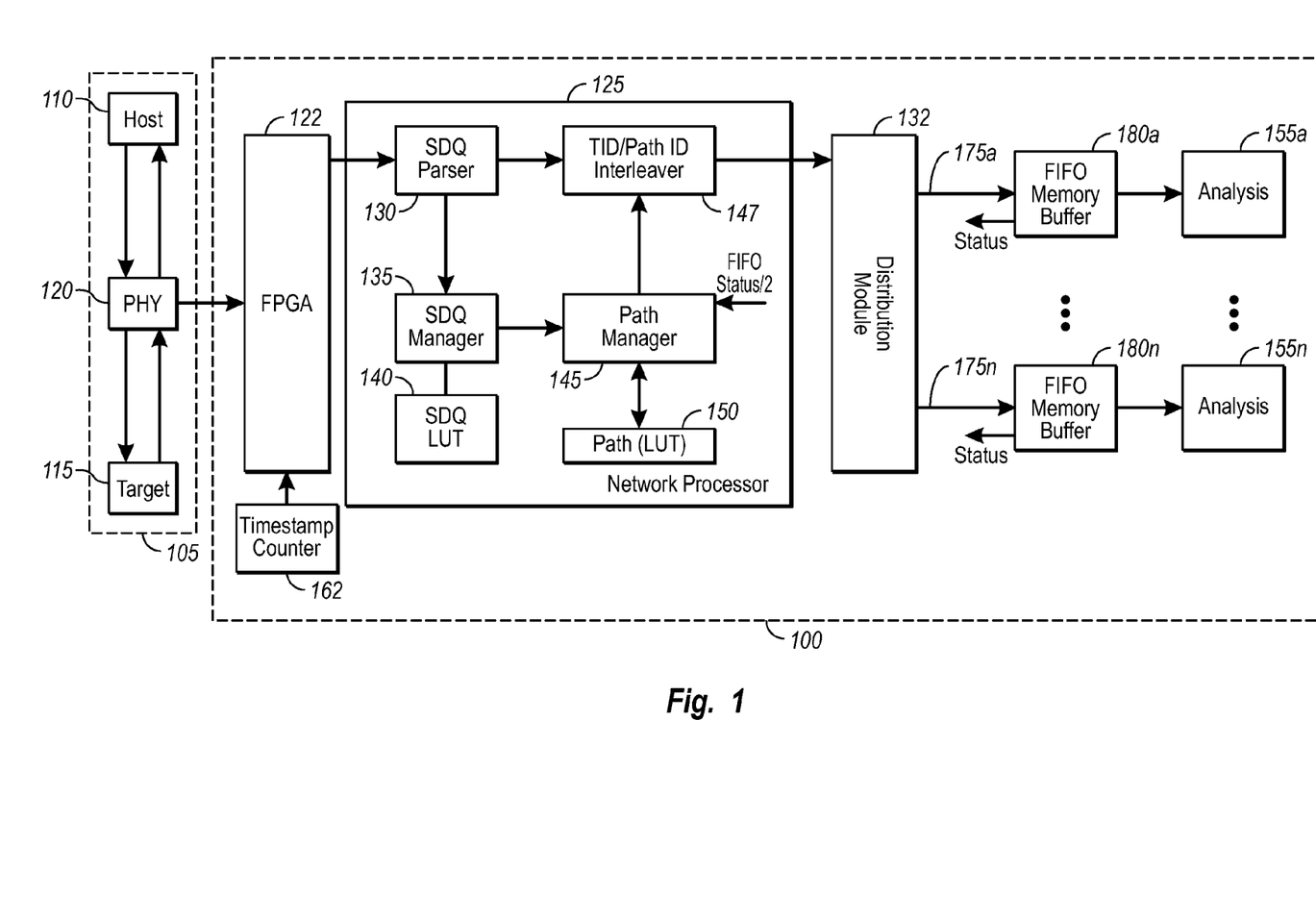
FIG. 1 illustrates an example embodiment of the present invention for preparing network data for analysis.

Referring to FIG. 1, an example embodiment of the present invention is illustrated for preparing network data for analysis. As illustrated, the present invention can be embodied by an analyzer 100 and the analyzer 100 can be coupled to a communications link 105. The communications link 105 can include a host 110 and a target 115 coupled together for bi-directional communication. A physical connection 120, such as a tap, can be coupled to the communications link for receiving network data and forwarding network data representing the network data transmitted between the host 110 and the target 115 to the analyzer 100. The analyzer 100 can include a front end FPGA 122, or other logic device, for receiving the network data.

The front end FPGA 122 or a network processor 125 can prepare the network data. For example, the front end FPGA 122, or other logic device, can prepare the network data by creating a special header for the network data. The header can contain a timestamp, and in cases where multiple ports are being analyzed, can contain a port number. Multiple ports can be defined simply as a Host port 110 and a Target port 115 as shown in FIG. 1, or there can be a larger number of ports since some protocols, such as Serial Attached SCSI (SAS), use multiple serial data streams for higher bandwidth, and the network data within a single transaction may be sent on any of the multiple ports. These multi-port/single-transaction streams can introduce new types of protocol errors associated with port selection and port management, for example, and the analyzer 100 can keep track of which port the packet or primitive came in on in order to troubleshoot port-related issues.

As previously mentioned, one aspect of the present invention includes the ability to prepare or modify network data. An example of such modified data is a modified frame which may include, for example, fields such as Header Type (type=packet), Timestamp, and Port Number together with the original data frame. Another example of modified data is a modified primitive, which contains fields such as Header Type (type=primitive), Timestamp, Port Number, and Repetitive Primitive Count, together with the original primitive. A Repetitive Primitive Count can be used if the front-end FPGA 122 counts repetitive primitives and sends a primitive value and count instead of sending each repetitive primitive individually.

The front end FPGA 122 can forward network data to the network processor 125. The network processor 125 can be any programmable network processor and can include multiple processors for executing computer executed instructions to perform the described tasks. The network processor 125 can also include internal and/or external memory devices for storing and accessing data. For example, according to an example embodiment of the present invention, the network processor 125 can be a general purpose programmable network processor such as an EZchip. An EZchip processor is an example of the network processor 125 that may be programmed to provide the functions described herein at a rate of speed sufficient to carry out many example embodiments of the present invention.

An EZchip NP-1c may be used and the NP-1c is a 10-Gigabit full-duplex network processor providing fully programmable 7-layer packet classification, modification, forwarding and policing at wire speed. The 7-layer deep packet processing can provide support for advanced services and applications such as Network Address Translation (NAT), firewall, Virtual Private Networks (VPN), load balancing, storage and traffic analysis in addition to mainstream Layer 2-4 switching and routing applications.

The network processor 125 can be any device, however, that keeps track of transactions. For example, the network processor 125 can be an FPGA, an EZ-chip, a microprocessor, or other logic device, but is not limited to processors that execute software or firmware. Network data can be combined with a timestamp received from a time stamp counter 162 to create a modified data frame which may then be sent to the network processor 125.

In operation, the network processor 125 can receive the data stream including network data prepared by the front end FPGA 122. An S/D/Q parser 130 can extract identification fields from the network data. For example, the parser 130 can be embodied as hardware and executable logic configured to extract fields such as source, destination, and Q tag (S/D/Q) information from a piece of network data. The S/D/Q information can relate to the source and destination of the transaction to which the network data belongs as well as an identification number (Q tag) assigned by the transmission system to the network data. The S/D/Q information can be sent to an S/D/Q look-up-table (LUT) manager 135 that can query an S/D/Q LUT 140 to determine whether the network data has been assigned a transaction identification (TID). The S/D/Q manager 135 can assign a TID to each packet or primitive based on the S/D/Q LUT 140 query and can update the S/D/Q LUT 140 in the case that a TID has not been already assigned. Although primitives do not have S/D/Q information embedded in them, the network processor 125 can determine the S/D/Q that the primitive is associated with based on the packets received before and/or after the primitive.

The TID can be received by a path manager 145, which can query a path LUT 150. The path manager 145 can determine an appropriate path based on the path LUT 150 query thereby indicating at least one of the analysis processors 155*a-n* assigned to the packet's TID. The path manager 145 can further prepare the network data by interleaving or inserting path and/or TID data with the network data using a TID/path interleaver 147. The timestamp, path, and/or TID data can be interleaved with the network data as fields included with each packet of data or primitive, or added as an additional header to each packet or primitive. For example, a SPI4.2 header can be inserted in the network data by the network processor 125 for purposes of directing the network data to a specific output port.

The interleaved path, TID, timestamp, and network data can be transmitted to distribution module 132. The distribution module 132 can be an FPGA or a demultiplexer for the routing the network data to a one of several outputs. However, any router chip (e.g., compliant with SPI4.2) can perform the job of the distribution module. For example, there are lots of ASICs designed as SPI4.2 routers that can distribute the network data.

The distribution module 132, such as a back-end FPGA, a router chip, or other demultiplexer, can receive the network data and route the network data to one of several possible outputs 175*a-n* according to the path or TID data interleaved with, or inserted into, the network data. The path data, as well as additional fields from the data packet or primitive, can be extracted by the distribution module 132 along with other appropriate information so that the distribution module 132 can establish an appropriate path for the correct duration to transfer the network data to one of the FIFO memory buffers 180*a-n*. The distribution module 132 can leave an established path open until a different path needs be established.

Upon routing the network data to a particular output of the distribution module 132, the network data is received within one of the plurality of FIFO memory buffers 180*a-n*. Each FIFO memory buffer 180*a-n* can send a status signal to the network processor 125 indicating an amount of data stored in the particular FIFO memory buffer's queue (e.g., FIFO 180*a*). The routing of the data to each of the FIFO memory buffers 180*a-n* can be controlled by the network processor 125 and carried out by the distribution module 132 such that the FIFO memory buffers 180*a-n* are not allowed to fill up completely, and so that the processing of the network data received from the communications link 105 can be distributed appropriately between the different analysis processors 155*a-n*.

The FIFO memory buffer receiving the data (e.g., 180*a*) can next forward the network data in turn to its corresponding analysis processor (e.g., 155*a*) to analyze the network data and store the results of the analysis. The results can be stored in an HDD that is part of the analysis processor (e.g., 155*a*). An additional storage processor can also be implemented and can include ready access memory for caching and managing the data storage processes. Also, multiple storage mediums, such as HDDs, can be coupled to each analysis processor 155*a-n* for storing network data for later retrieval and analysis as needed.

According to another aspect, the network processor 125 or the FPGA 122 may pre-analyze the data so that the amount of analysis performed by the analysis processors 155*a-n* can be reduced, or the amount of network data that is transferred to the analysis processors 155*a-n* can be reduced. For instance, rather than providing each packet and each primitive in a transaction to an analysis processor 155a-n, the network processor 125 or the front end FPGA 122 can summarize each transaction and only provide the summary data to the analysis processor 155a-n. For example a summary could include an S/D/Q, a command, a response, a number of payload bytes, a number of payload packets, a start time, and an end time. Additionally, the preparation of the network data may include any of the methods described herein and can be accomplished using a variety of apparatuses.

Figure 2:
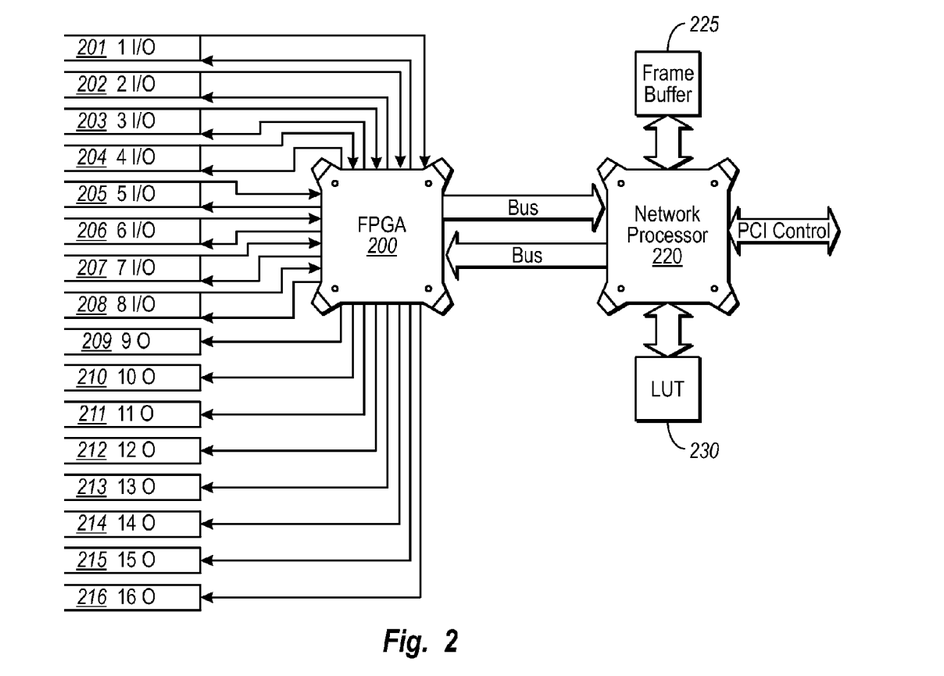
FIG. 2 illustrates components of an analysis system according to an example embodiment of the present invention.

Referring to FIG. 2, components of an analysis system are shown according to an example embodiment of the present invention. A front end FPGA 200 can be implemented to receive multiple inputs and outputs from various ports of a communications system. Each port of the front end FPGA 200 can receive network data from a different communication link of a communication system. For example, the front end FPGA 200 can include eight input/output ports 201-208 and eight output only ports 209-216 as shown in FIG. 2. The front-end FPGA 200 can include any number of ports and the configuration in FIG. 2 is shown for illustration only. The front-end FPGA 200 can prepare the network data received from each input port 201-208 for subsequent analysis. For example, the front-end FPGA 200 can perform framing, timestamping, payload filtering, and primitive counting. The front end FPGA 200 can be in bidirectional communication with a network processor 220. The network processor 220 can be coupled to lookup tables 230 for indexing information related to a path for each piece of network data, and also for performing additional filtering and modification of network data or portions of network data. The network processor 220 can be further coupled to a frame buffer 225 for storing and accessing frames for additional processing by the network processor 220. The network processor 220 can be coupled to an analysis processor (not shown) for PCI control and for analysis of the network data.

Figure 3A:
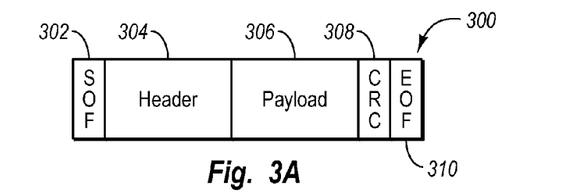
FIGS. 3A and 3B illustrate a typical frame and a modified frame according to an example embodiment of the present invention.
Figure 3B:
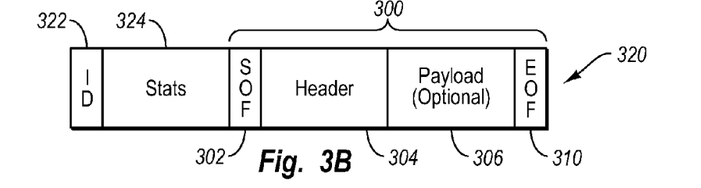

Referring to FIGS. 3A and 3B, an original frame 300 and a modified frame 320 are illustrated according to one embodiment of the present invention. As shown in FIG. 3A, an original frame 300 may include a start-of-frame ("SOF") primitive 302, a header 304, a payload 306, a cyclic redundancy check ("CRC") field 308, and an end-of-frame ("EOF") primitive 310. According to one embodiment of the present invention, the original frame 300 may be prepared for analysis by adding or deleting data to create a modified frame 320.

As shown in FIG. 3B, an exemplary modified frame 320 may include an ID field 322, a stats field 324, together with data associated with the original frame 300. Optionally, the payload 306 and CRC field 308 of the original frame 300 may be excluded.

The original frame 300 may be modified by an FPGA, a network processor, or other logic device. The statistics ("stats") field 324 can include a port number, a timestamp, or other descriptive information. The ID field 322 can be an identification assigned by the FPGA or other device. The payload 306 can be excluded from the frame 320 for any reason. For example, the payload 306 can be excluded where analysis of the payload 306 will not be conducted and as a result there is no need to transmit the payload 306 to an analysis processor. An indication that the payload 306 has been excluded can be written to the stats field 324, or other portion of the modified frame 320. Different fields of the modified frame 320 can include fields according to the SPI4.2 standard, or other standards.

Once the typical frame 300 has been received, the payload 306 may be completely or partially removed, and the statistics inserted into a stats field 324. The modified frame 320 can then be multiplexed into one SPI4.2 data stream along with other frames, which can be fed into the network processor (e.g., an EZchip NP-1c).

A front-end FPGA can also generate tick frames. Tick frames can be used to notify the network processor that a certain amount of time (e.g., 1 second) has elapsed. Reception of a tick frame can signal the network processor to upload statistics to an analysis processor in a chassis. Additionally, R_RDY ordered sets can be timestamped and sent to the network processor via an R_RDY frame. Similar to the R_RDY Frame, a primitive or ordered set can be timestamped and sent to the network processor via a primitive frame. The primitive frame may also include a repetition count such that only the last primitive in a sequence of repetitive primitives need be sent to the network processor. There can also be a special frame for passing 10b data associated with single-byte coding or disparity errors, and a special frame for passing the number of bit-times that common-mode signaling was detected.

According to an example embodiment, the ID field of a modified frame can indicate the type of frame. Different ID fields can include SPI4.2 frame identifiers and can identify the frame as one of a Fibre Channel frame, a tick frame, an R_RDY Frame, a primitive frame, a single-byte error frame, or a common mode frame. The stats field can include various information such as a timestamp, a port number, a latched port status, a dropped frame count, frame status flags, and payload byte count. For example, the different fields can include information, and examples of the types of information are illustrated in Chart 1 shown below.

CHART 1

| | | |
|---|---|---|
| ID (322) | 1 byte | SPI4.2 Frame identifier.<br>0x00 - Reserved<br>0x01 - FC Frame<br>0x02 -- 0x0F - Reserved<br>0x10 - Tick Frame<br>0x20 - R_RDY Frame<br>0x21 - Primitive Frame<br>0x30 - Single-Byte Error Frame<br>0x40 - Common Mode Frame<br>0x04-0xFF - Reserved |
| stats: (324)<br>Timestamp | 7 bytes | 56-bit timestamp, 100 MHz clock. |
| stats: (324)<br>Port Number | 1 byte | Probe Port Number<br>Bits 7:3 can be reserved and can be 0 in a 4-port chassis, for example. |
| stats: (324)<br>Latched Port<br>Status | 1 byte | Port Status (latched) since last frame.<br>If any of the events described below have occurred since the last frame was transmitted to the NP-1c, the |

CHART 1-continued

| | | |
|---|---|---|
| | | appropriate bit in this field can be set. The actual counter value for the number of events that has occurred for each port can be read via the Control and Status Registers, which are accessible via the PLX interface.<br>Bits 7:6 can be reserved and can be 0.<br>Bit 5 - Link Up.<br>Bit 4 - Loss of Sync. Loss of word synchronization, since the last frame was received.<br>Bit 3 - Loss of Signal. Loss of signal from the SFP, since the last frame was received.<br>Bit 2 - Code Violation. Presence of a 10b code violation or disparity error since the last frame was received.<br>Bit 1 - NOS/OLS. Presence of a NOS or OLS ordered set, since the last frame was received.<br>Bit 0 - LIPs. Presence of a LIP ordered set since the last frame was received. |
| stats: (324) Dropped Frame Count | 2 bytes | Number of dropped frames since the last frame was properly received. When this counter is the maximum value, it can stop incrementing. In other words, a value of 0xFFFF can mean "65535 or more". |
| stats: (324) Frame Status Flags | 1 byte | Frame Status Flags<br>Bit 7 - Reserved, e.g., can be 0.<br>Bit 6 - Tick Frame Toggle Bit. Initially this bit can be 0. This bit can change to a 1 for all frames sent after the first tick frame, and can toggle after each successive tick frame.<br>Bit 5 - Payload Present. 0=not present, 1=present. The payload can be omitted if the frame is a SCSI data frame (R_CTL=0x01 and TYPE=0x08). Otherwise, the first 48 words of the payload can be included.<br>Bit 4 - Code Violation. Designates that the frame contained a 10b code violation or a disparity error. e.g., 0=no code violation, 1=code violation.<br>Bit 3 - CRC OK. 0=CRC bad, 1=CRC OK.<br>Bit 2 - Runt Frame (frame can be shorter than the legal size, 6 32-bit words plus SOF, CRC, EOF). 0=not runt frame, 1=runt frame.<br>Bit 1 - Jabber Frame (payload is larger than 2112 bytes, or 528 32-bit words). 0=not jabber frame, 1=jabber frame.<br>Bit 0 - no EOF. 0=EOF present, 1=no EOF present. |
| stats: (324) Payload Byte Count | 2 bytes | Payload Byte Count. |
| SOF (302) | 4 bytes | The original SOF ordered set from the FC frame. |
| Header (304) | 24 bytes | The original header from the frame (e.g., a FC frame). |
| payload (optional) (306) | 0 bytes or 192 bytes | The first 48 32-bit words of the payload, if the frame is a non-SCSI data frame. This field will be present if the "Payload Present" bit is set, in the "stats: Frame Status Flags" field. |
| EOF (300) | 4 bytes | The original EOF ordered set from the FC frame. |
| Reserved | | Reserved fields can be all 0's, and can be reserved for possible future use. |

Figure 4:
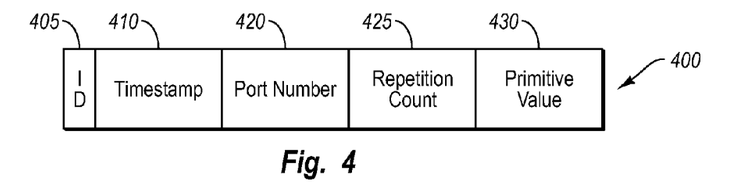
FIG. 4 illustrates an embodiment of a modified primitive according to an example embodiment of the present invention.

Referring to FIG. 4, a modified primitive 400 can include an ID 405, a timestamp field 410, a port number field 420, and any other information, which can be written to the modified primitive 400 by an FPGA or other device. Repetition count information 425 can be written to the modified primitive 400 where multiple primitives have been excluded and the repetition count portion 425 of the modified primitive 400 can describe the total number of primitives in a sequence of primitives. The value 430 of the primitives can be included with the primitive 400 so that an analysis processor can keep track of the number of primitives received and the number of primitives excluded, and their respective values.

A modified primitive frame 400 may be generated each time a single primitive (ordered set) is received, or a sequence of primitives is received. A front-end FPGA can send the modified primitive frame 400 at the end of a sequence of identical primitives. The timestamp value 410 embedded in the modified primitive 400 is for the first primitive in the sequence.

The fields 405-430 of the modified primitive 400 can include information inserted or removed by a front end FPGA or a network processor. Examples of information that can be included in a modified primitive 400 embodiment are illustrated in Chart 2 shown below.

CHART 2

| | | |
|---|---|---|
| ID (405) | 1 byte | SPI4.2 Frame identifier.<br>0x00 - Reserved<br>0x01 - FC Frame<br>0x02-0x0F - Reserved<br>0x10 - Tick Frame<br>0x20 - R_RDY Frame<br>0x21 - Primitive Frame<br>0x30 - Single-Byte Error Frame<br>0x40 - Common Mode Frame<br>0x04-0xFF - Reserved |
| Timestamp (410) | 7 bytes | 56-bit timestamp, 100 MHz clock. |
| Port Number (420) | 1 byte | Probe Port Number<br>Bits 7:3 are reserved and will always be 0 in a 4-port chassis. |
| Repetition Count (425) | 3 bytes | 24-bit count of the number of identical primitives in the sequence |
| Primitive Value (430) | 4 bytes | The primitive value in 8b format |

Figure 5:
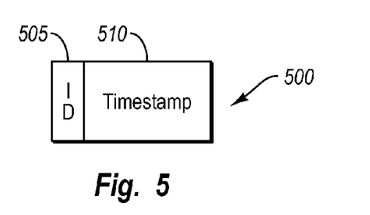
FIG. 5 illustrates an example of a generated frame according to an example embodiment of the present invention.

In addition to modifying typical frames and typical primitives, additional network data can be generated by the front-end FPGA and/or the network processor. For example, tick frames and R_RDY frames can be generated according to an aspect of the present invention. Referring to FIG. 5, an example of a generated frame 500 is shown according to an example embodiment of the present invention. The frame 500 can be a tick frame that may be generated at a predetermined period of time. For example, the tick frame can be generated every second. The tick frame can include an ID field 505 and a timestamp field 510. The frame 500 can also be an R_RDY frame and can be generated each time an R_RDY ordered set is received. The fields 505-510 of the generated frame 500 can include information and an example of the information that can be included is illustrated in Chart 3 below.

CHART 3

| | | |
|---|---|---|
| ID (505) | 1 byte | SPI4.2 Frame identifier.<br>0x00 - Reserved<br>0x01 - FC Frame<br>0x02-0x0F - Reserved<br>0x10 - Tick Frame<br>0x20 - R_RDY Frame<br>0x21 - Primitive Frame<br>0x30 - Single-Byte Error Frame<br>0x40 - Common Mode Frame<br>0x04-0xFF - Reserved |
| Timestamp (510) | 7 bytes | 56-bit timestamp, 100 MHz clock. |
| Reserved | | Reserved fields can be all 0's, and can be reserved for future use. |

Pre-analysis of the network data, such as identification of errors, may be conducted before the analysis processor receives the data. For example, levels of analysis may be conducted at the physical connection, decoder, FPGA, and/or at a network analyzer. During this pre-analysis, frames may be generated which indicate the results of the pre-analysis. For example, referring to FIG. 6, a single-byte error frame 600 can be generated each time an error, such as a coding error or disparity error, is detected by a decoder. An example of a disparity error occurs when a probe does not have the ability to provide 10b data because the physical connection only provides 8b data to the rest of the logic. According to one embodiment of the present invention, the 8b/10b logic can be moved into the front-end FPGA logic so that 10b data can be provided when an error occurs. Similarly, a timestamp value 610 may be embedded in the frame 600 that is the same for the timestamp in the primitive or frame that contained the error. Information can be included in the fields 605-630 of the single-byte error frame 600. Examples of the types of information that can be provided by the fields of the single-byte error frame 600 are illustrated in Chart 4 below.

CHART 4

Figure 6:
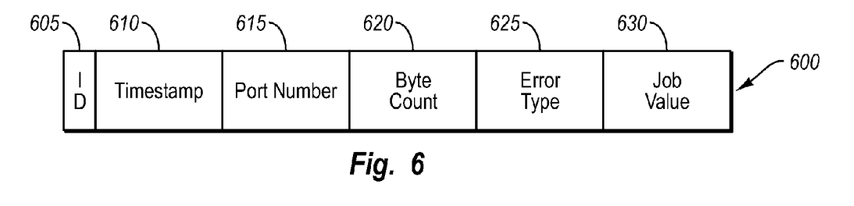
FIG. 6 illustrates a single-byte error frame according to an example embodiment of the present invention.

| | | |
|---|---|---|
| ID (605) | 1 byte | SPI4.2 Frame identifier.<br>0x00 - Reserved<br>0x01 - FC Frame<br>0x02-0x0F - Reserved<br>0x10 - Tick Frame<br>0x20 - R_RDY Frame<br>0x21 - Primitive Frame<br>0x30 - Single-Byte Error Frame<br>0x40 - Common Mode Frame<br>0x04-0xFF - Reserved |
| Timestamp (610) | 7 bytes | 56-bit timestamp, 100 MHz clock. |
| Port Number (615) | 1 byte | Probe Port Number<br>Bits 7:3 are reserved and can be 0 in a 4-port chassis. |

CHART 4-continued

| | | |
|---|---|---|
| Byte Count (620) | 3 bytes | 24-bit count of the Byte Location in the frame or primitive sequence where the error occurred |
| Error Type (625) | 6 bits | 0x00 - Unknown<br>0x01 - Coding Error<br>0x02 - Disparity Error<br>0x03-0x3F - Reserved |
| 10b Value (630) | 10 bits | The byte value in 10b format |

A frame can be generated identifying a type of signal received. For example, referring to FIG. 7, a common mode frame 700 may be generated whenever common mode signaling is detected by the physical connection, the FPGA, a decoder, or the network processor. This particular example may only apply to busses such as SATA, SAS, and PCI Express that use common mode signaling for event notification or as a handshaking method. A timestamp value 710 embedded in the common mode frame 700 can be the time when the common mode signaling began. A bit count 720 can be the number of bit times that the common mode signaling lasted. Information can be included in the fields 705-720 of the common mode frame 700. Examples of the types of information that can be provided by the fields of the common mode frame are illustrated in Chart 5 below.

CHART 5

Figure 7:
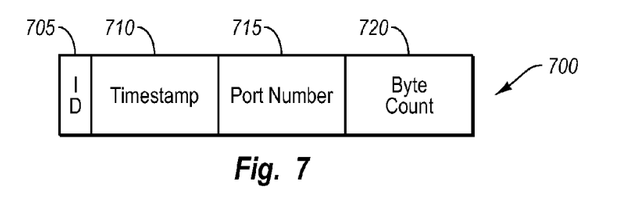
FIG. 7 illustrates a common mode frame that can be generated according to an example embodiment of the present invention.

| | | |
|---|---|---|
| ID (705) | 1 byte | SPI4.2 Frame identifier.<br>0x00 - Reserved<br>0x01 - FC Frame<br>0x02-0x0F - Reserved<br>0x10 - Tick Frame<br>0x20 - R_RDY Frame<br>0x21 - Primitive Frame<br>0x30 - Single-Byte Error Frame<br>0x40 - Common Mode Frame<br>0x04-0xFF - Reserved |
| Timestamp (710) | 7 bytes | 56-bit timestamp, 100 MHz clock. |
| Port Number (715) | 1 byte | Probe Port Number<br>Bits 7:3 can be reserved and can be 0 in a 4-port chassis. |
| Bit Count (720) | 3 bytes | 24-bit count of the number of bit-times of common mode signaling. A value of 0xFFFFFF means 16,777,215 bit times or greater. |
| Reserved | 4 bytes | Reserved fields will be all 0's, and are reserved for possible future use. |

Figure 8:
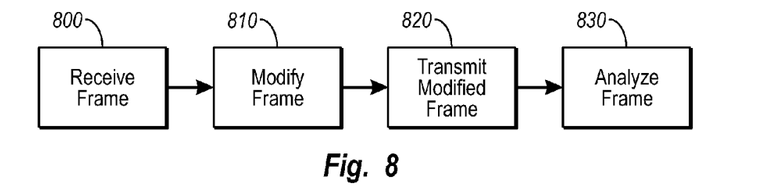
FIG. 8 illustrates a method for preparing data according to an example embodiment of the present invention.

Referring to FIG. 8, a method for preparing data is shown according to an example embodiment of the present invention. A network data frame can be received (800). The frame can be a packet or primitive, for example. The frame can include several portions, such as a SOF field, a header field, a payload, CRC field, and an EOF field.

The network data can be modified (810). For example, the frame can have additional fields inserted. The fields can have additional information inserted describing the frame or other frames. The fields inserted can describe additional fields that may have been removed or not transmitted on to an analysis processor. The fields inserted can also describe any component of a network analysis system. For example, the field inserted can describe a port from which the frame was received. Fields and/or a payload can be removed from the frame. For example, a payload, timing field, or any other information or data can be removed from the frame. The addition and removal of fields and a payload describe the other action. For example an addition of a frame can describe that a payload was removed. In addition, the absence of a payload with a particular identification field can indicate that the payload was removed.

The modified network data frame can be transmitted (820). The modified frame can be transmitted to memory or to an analysis processor. The modified frame can be received by a memory buffer, such as a FIFO memory buffer, and received in turn by an analysis processor. The modified frame can also be received by another storage medium and retrieved for any purpose, such as for analysis of the modified frame.

Analysis can be conducted on the modified frame (830). The analysis can be conducted by an analysis processor or other logic device. The analysis processor can take the form of a conventional or a special purpose processor. Some lower levels of analysis can also be conducted by logic devices such as recognizing certain fields or information in the frame and performing analysis based on such fields or information.

Figure 9:
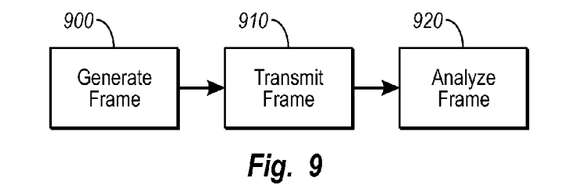
FIG. 9 illustrates a method for preparing data according to an example embodiment of the present invention.

Referring to FIG. 9, a method for preparing network data is illustrated according to an example embodiment of the present invention. Network data frames can be generated (900). The generated frame can be generated in response to a condition identified by a component of an analysis system. For example, where an error is identified or a type of signaling is identified, a frame can be generated describing the identification and any parameters of the condition. Where a coding error or a disparity error is identified, a frame can be generated describing that such an error was identified, a location of the error, and/or a value of the error. Where a type of signaling is identified, such as common mode signaling, a frame can be generated indicating that the signaling was identified, providing a location of the signaling received, and/or duration of the signaling. Any attribute of the error or signaling can be included in the generated frame. The generated frame can also describe other frames. For example, where a sequence of frames are received with at least similar attributes. A frame can be generated describing the sequence of frames and/or describing an exclusion of a frame from analysis.

The generated network data frame can be transmitted (910). The generated frame can be transmitted to memory or to an analysis processor. The generated frame can be received by a memory buffer, such as a FIFO memory buffer, and received in turn by an analysis processor. The generated frame can also be received by another storage medium and retrieved for any purpose, such as for analysis of the generated frame.

Analysis can be conducted on the generated frame (920). The analysis can be conducted by an analysis processor or other logic device. The analysis processor can take the form of a conventional or a special purpose processor. Some lower levels of analysis can also be conducted by logic devices such as recognizing certain fields or information in the generated frames and performing analysis based on such fields or information.

At least a portion of some of the embodiments of the present invention can comprise a special purpose or general-purpose computer, processor, or logic device including various computer hardware and devices, as discussed in greater detail herein. Embodiments within the scope of the present invention can also include computer-readable media for carrying or having computer-executable instructions or data structures stored thereon. Such computer-readable media can be any available media that can be accessed by a general purpose or special purpose computer, processor or logic device. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose computer, special purpose computer, or other logic device. When information is transferred or provided over a network or another communication connection (either hardwired, wireless, or a combination of hardwired or wireless) to a computer, the computer properly views the connection as a computer-readable medium. Thus, any such connection is properly termed a computer-readable medium. Various combinations of the above should also be included within the scope of computer-readable media. Computer-executable instructions comprise, for example, instructions, logic, and data which cause a general purpose computer, special purpose computer, or special purpose processing device to perform a certain function or group of functions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for preparing network data comprising the following acts:
receiving a data stream that includes a plurality of frames at a front end device that prepares the plurality of frames for analysis, wherein each frame comprises: a frame identifier field, wherein the identifier field includes identification information identifying a type of frame; and at least one of the following fields: a latched port status field; a dropped frame count field; a frame status flag field; a payload byte count field; a port number field; a byte count field; an error type field; or a 10b value field;
dividing the plurality of frames into a plurality of lower bandwidth streams;
removing a payload of each frame prior to transmission of the plurality of frames to a plurality of processors; and
performing protocol analysis on each of the plurality of lower bandwidth streams.

2. A method according to claim 1, wherein each frame is a fibre channel frame and each identifier is a SPI4.2 frame.

3. A method according to claim 1, wherein at least one frame is a primitive frame.

4. A method according to claim 1, wherein the frame identifier field identifies the fibre channel frame as either an FC frame, a tick frame, an R_RDY frame, a primitive frame, a single-byte error frame, or a common mode frame.

5. A method according to claim 1, wherein at least one frame is modified by adding an identifier field to the at least one frame identifying the type of frame, wherein the payload is removed, and at least one of the following fields are added to each frame: a timestamp field; a port number field; a latched port status field; a dropped frame count field; a frame status flag field; or a payload byte count field.

6. A method according to claim 1, wherein a sequence of identical frames are received and at least one frame is modified to include at least one of the following fields: a frame identifier field identifying the frame as one of a primitive frame, a tick frame, or a R_RDY frame; and a timestamp field.

7. A method according to claim 6, wherein the frame identifier field identifies the at least one frame as a primitive frame, wherein the at least one frame, when transmitted, further includes the following fields: a port number field; a repetition field describing the number of identical frames in the sequence; and a primitive value field describe the primitive value.

8. A method as defined in claim 1, further comprising combining results of the protocol analysis performed on the plurality of lower bandwidth streams to provide protocol analysis of the data stream.

9. A method for preparing network data for protocol analysis, the method comprising:
 generating a frame prior to being transmitted, wherein the frame is generated when a common mode signal is detected by a physical connection to a communications link;
 generating fields for the frame including at least one of a frame identifier field identifying the frame as a Common Mode Frame, a timestamp field, a port number field; and a bit count field;
 transmitting the frame, wherein the frame identifier field includes identification information identifying a type of frame and at least one of the following fields: a latched port status field; a dropped frame count field; a frame status flag field; a payload byte count field; a port number field; a byte count field; an error type field; or a 10b value field,
 wherein generating the transmitted frame further comprises:
  receiving an original frame representing a frame transmitted in a communications link, wherein the original frame comprises a payload;
  removing at least a portion of the payload from the original frame; and
  inserting at least one of the following fields into the original frame to generate a modified frame: the timestamp field; the port number field; the latched port status field; the dropped frame count field; the frame status flag field; and the payload byte count field.

10. A method according to claim 9, further comprising the act of inserting a frame identifier that identifies the original frame as a fiber channel frame.

11. A method according to claim 9, wherein generating a frame further comprises generating a frame upon detection of an error by either a decoder, field programmable gate array, or network processor.

12. A method according to claim 11, wherein the error type field identifies the error as either a coding error or a disparity error.

13. A system for preparing network data comprising:
 a network processor configured to analyze a data stream and distribute portions of the data stream for analysis; and
 a logic device having an input port and an output port, the logic device connected to the network processor, wherein the logic device prepares the data stream for the network processor, wherein the logic device comprises one or more modules that are configured to:
  remove at least a portion of a payload of an original frame to create a modified frame;
  insert data statistics into the original frame;
  insert a frame identifier field into the original frame;
  generate a tick frame comprising the frame identifier field identifying the frame as a tick frame and a timestamp field;
  generate a primitive frame comprising the frame identifier field identifying the frame as a primitive frame, a repetition count field describing a number of identical primitives received by the logic device, and a primitive value field describing the value of each of the primitives received in the sequence;
  generate a single-byte error frame each time an error is detected by a decoder or the logic device, wherein the single-byte error frame comprises a frame identifier field identifying the frame as a single-byte error frame, a byte count field, an error type field, and a field describing the byte value; or
  generate a common mode frame when common mode signaling is detected by a physical connection to a communications link, wherein the common mode frame comprises a frame identifier field, a timestamp field, and a bit count field describing a duration of the common mode signaling.

14. The system of claim 13, wherein the logic device includes an executable instruction which, when executed by the logic device, causes the logic device to generate a port number field describing a port of the logic device.

15. A system according to claim 13, wherein the logic device is a field programmable gate array (FPGA) having a plurality of input ports and a plurality of output ports.

16. A system according to claim 15, further comprising an analysis processor coupled to the network processor for performing analysis of the network data received from the network processor.

17. A system according to claim 16, further comprising: a distribution module coupled to the network processor for receiving the network data along with control information from the network processor for receiving the network data and control information and routing the data to any of a plurality of analysis processors.

* * * * *